United States Patent [19]
Conrad et al.

[11] 3,713,348
[45] Jan. 30, 1973

[54] CENTERLINE TRACKING ROLLERS FOR CLOSED LOOP SYSTEMS

[75] Inventors: Rene Conrad, San Mateo; John Hohmann, Sunnyvale, both of Calif.

[73] Assignee: Dynaloc Corporation, Sunnyvale, Calif.

[22] Filed: Sept. 27, 1971

[21] Appl. No.: 183,808

Related U.S. Application Data

[63] Continuation-in-part of Ser. No. 75,913, Sept. 28, 1970, abandoned.

[52] U.S. Cl. ............................. 74/240, 74/230.5
[51] Int. Cl. ..................... F16h 7/18, F16h 55/36
[58] Field of Search ............... 74/240, 230.3, 230.5

[56] References Cited

UNITED STATES PATENTS

| | | | |
|---|---|---|---|
| 1,678,925 | 7/1928 | Tackaberry | 74/240 |
| 2,622,448 | 12/1952 | Lorig | 74/230.5 X |
| 2,870,490 | 1/1959 | Freedlander | 74/240 X |
| 3,430,506 | 3/1969 | Stone | 74/230.5 |

*Primary Examiner*—Leonard H. Gerin
*Attorney*—Leslie M. Hansen

[57] ABSTRACT

Centerline Tracking Rollers in which tubular cylindrical members have oppositely wound spirally tending ribbing on their peripheries on opposite sides of a central depression, the ribbing being applied wire elements either pre-coiled or wound directly onto the cylindrical members or into grooves formed in the peripheries thereof which may be grooved for seating the wire elements and the grooves of diminishing depth from center to the ends of the cylindrical members to provide tapering spirally tending ribbing thereon; the convolutes of such wire elements may be plain or undulated by waveforms for non-slip gripping and centering action relative to belting trained about such rollers.

20 Claims, 13 Drawing Figures

PATENTED JAN 30 1973 3,713,348

INVENTORS
RENE' A. CONRAD
and JOHN P. HOHMANN

BY
Leslie M. Hansen
THEIR ATTORNEY

RATIO 12 & UNDER

RATIO 35 & UNDER

RATIO 50 & UNDER

ANY RATIO-ONE END

INVENTOR'S
RENE' A. CONRAD
and JOHN P. HOHMANN

BY Leslie M. Hansen

THEIR ATTORNEY

CENTERLINE TRACKING ROLLERS FOR CLOSED LOOP SYSTEMS

This application is a continuation in part of our application Ser. No. 75,913, filed Sept. 28, 1970, for Pulleys and Rollers and now abandoned. The invention relates to centerline tracking rollers and more particularly to means on tracking rollers for aligning belting, paper, plastics, wovenwire and continuous strips of like material relative to a precise central path thereof.

BACKGROUND

Tracking and aligning of strips or strip-like material on rollers or pulleys has been a universal problem. Tracking implies the maintenance of the width of belting in full tractional engagement within the length of tracking rollers regardless of slight wandering to either side of a central path. Aligning implies the running of belting and the like with the longitudinal center of its travel coincident to the center between the ends of the tracking rollers with a minimum of or little or no weaving relative thereto.

Heretofore, the problem has been approached in several different ways. In some cases, edge engaging rollers have been employed but are impractical due to their extending above the weight bearing reach of such belting. Crowned and/or tapered rollers have been employed to prevent the belting from running sidewise. Wormed surfaced rollers have also been applied in the form of integral ridges outwardly tending spirally from center of both rollers and functioning as spreader rolls to stretch paper and the like to either side from center and to prevent creasing of the web material. See U.S. Pat. No. 1,095,445, May 5, 1914, to Alvey; U.S. Pat. No. 1,568,401, Jan. 5, 1926, to Griffith; and U.S. Pat. No. 1,660,538, Feb. 28, 1928, to Whitney.

U.S. Pat. No. 2,176,835 which issued to Cumfer Oct. 17, 1939, shows a continuous web of fibrous felt paper trained over and under alternate upper and lower rollers, the latter of which are in a bath of liquid asphalt for saturating the fibers of the web with liquid asphalt in the process of producing tar paper. Cumfer shows worm grooved surfaced upper rollers spiralling toward center for web centering and lower rollers spirally grooved away from center for spreading the liquid asphalt crosswise the web as well as for counteracting any distortions or strain exerted upon the web fibers caused by the grooves of the top roll centering action. Cumfer claimed the process of insuring optimum saturation of the fibrous web by exerting oppositely directed forces transversely of the web for spreading the liquid asphalt crosswise thereof incidental to the centering action of the upper rollers.

Another form of centering rollers recently developed includes a cylindrical roll covered with a resilient material such as rubber provided with a number of annular slots in the form of cup-like rings spaced along its length and each inclined from each end toward roll center plus a center radial slot around center. The cup-like rings between inclined slots deform inwardly toward center under pressure of the belting for centering the latter. The amount of centering action is controlled by the width, depth and spacing of the slots, modules of elasticity of the rubber covering and the speed at which the rollers rotate.

STATEMENT OF INVENTION

As the distance between pulley and rollers of a closed loop system shorten and particularly in cases where the closed loop belting approaches a square configuration, it has been found impossible, with crowned rollers as in the present state of the art, to achieve centering of the belting therein. It is an object of the present invention to overcome this deficiency in short centered pulley systems as well as in conventional systems of longer reaches between pulley centers.

In accordance with the present invention, it has been discovered that tracking, centering and aligning of belting thereon can be obtained between coacting rollers at relatively close centers with the rollers of the present invention. Once the self-centering setting of a pair of such rollers in a closed loop system is achieved, the belting will remain centered regardless of the ratio of its load bearing reach to belt width and roller diameter. The system allows for very wide belt tracking on short pulley centers as well as for narrow belting on pulleys centered greater than belt widths.

The present invention contemplates the provision of means for tracking and centering closed loop belting over a unique form of rollers which are simple in construction, economical to manufacture and highly efficient in use. According to this invention, it is an object to provide a cylindrical roller with centering means spirally tending from each end thereof toward center and diminishing in depth from center outwardly toward the ends of the roller.

It is another object to provide true cylindrical rollers with spiral grooves diminishing in depth from each end thereof toward center as a seat for spring wires coiled thereabout to provide a crowned spiralled tracking and centering belt engaging surface thereon.

It is yet another object to provide a tapered roller with pressed fit end bearings and oppositely tending spiral grooves and spirally coiled wire elements of suitable diameter and pitch seated in such grooves providing a crowned centering roller.

It is still a further object to provide such crowned centered rollers with right and left hand spirally tending grooves terminating in matched spaced relation adjacent a depressed center of the rollers and having coiled spring wires diametered to fit snugly into the grooves to provide ribs for centering and tracking belting relative to such rollers.

It is a further object to provide such spiral wire ribs with undulations as a waveform on each convolute for gripping action relative to belting engaging the same. In this connection, it is a further object to form the undulations in the spiralled wire at spacings relative to the circumference of the roller such that the undulations themselves collectively provide a spiralled pattern lengthwise of the rollers also tending to influence the belting with an inwardly centering or an outwardly expanding thrust from the spiralled ribs.

It is another object to relate the pitches of the opposing spiralled ribs to the diameter of the rollers relative to the speed of rotation thereof whereby to balance the weave of woven belting with the influence of the outwardly expanding thrust from the spiralled ribs.

It is yet another object to eliminate belt wear and a cooling system thereto by providing an air space between convolutes of the spiralled ribs and the cylindrical surface of the rollers.

These and other objects and advantages of the present invention will become apparent in the following description and claims when read in the light of the accompanying three sheets of drawing, in which:

Figure 8:
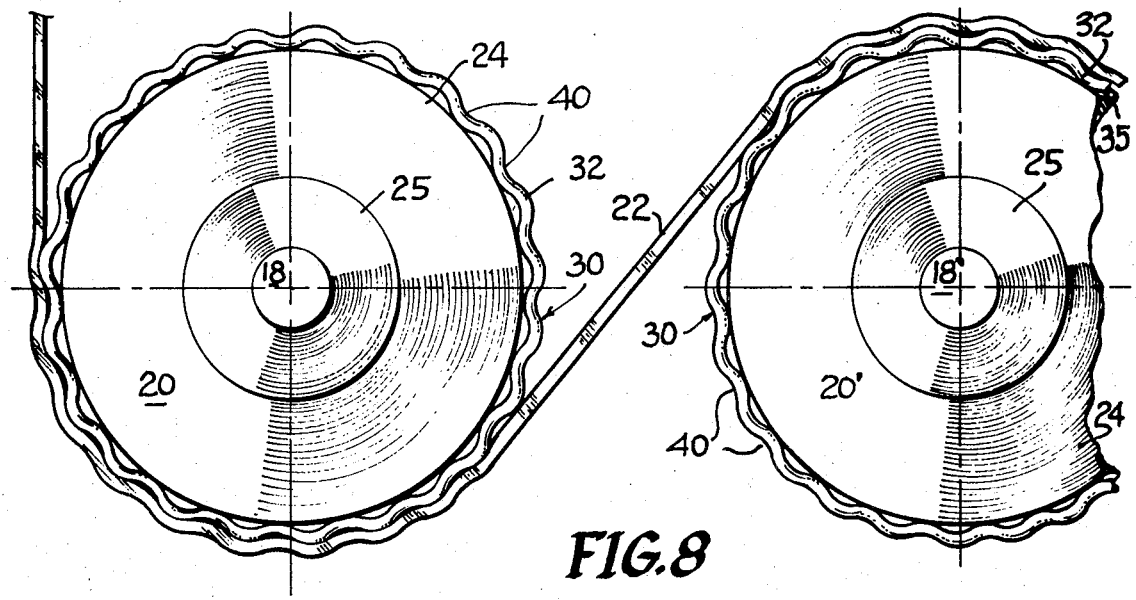
FIG. 8 is an enlarged detail endwise of a pair of rollers, one of which is fragmentarily shown and each of which has undulated wires spirally wound thereon providing a waveform therein.
Figure 12:
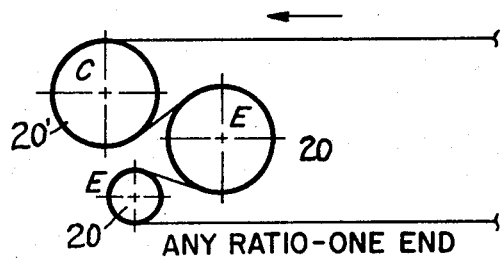
Figure 13:
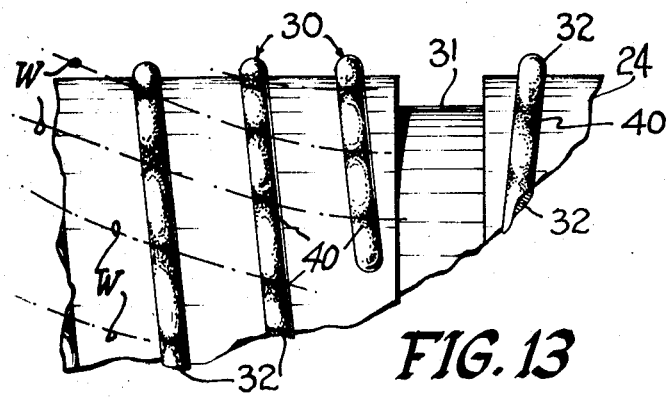

FIG. 12 is a diagram of still another manner of attaining the belt aligning feature of the present invention; and FIG. 13 is a fragmentary elevational view of a portion of one of the rollers of FIG. 8 illustrating the waveform in the spiralled ribs as well as the collective spiralling waveform offered by the offset spiral relation of the undulations in adjacent convolutes of waveformed ribbing in accordance with the present invention.

GENERAL DESCRIPTION

Figure 1:
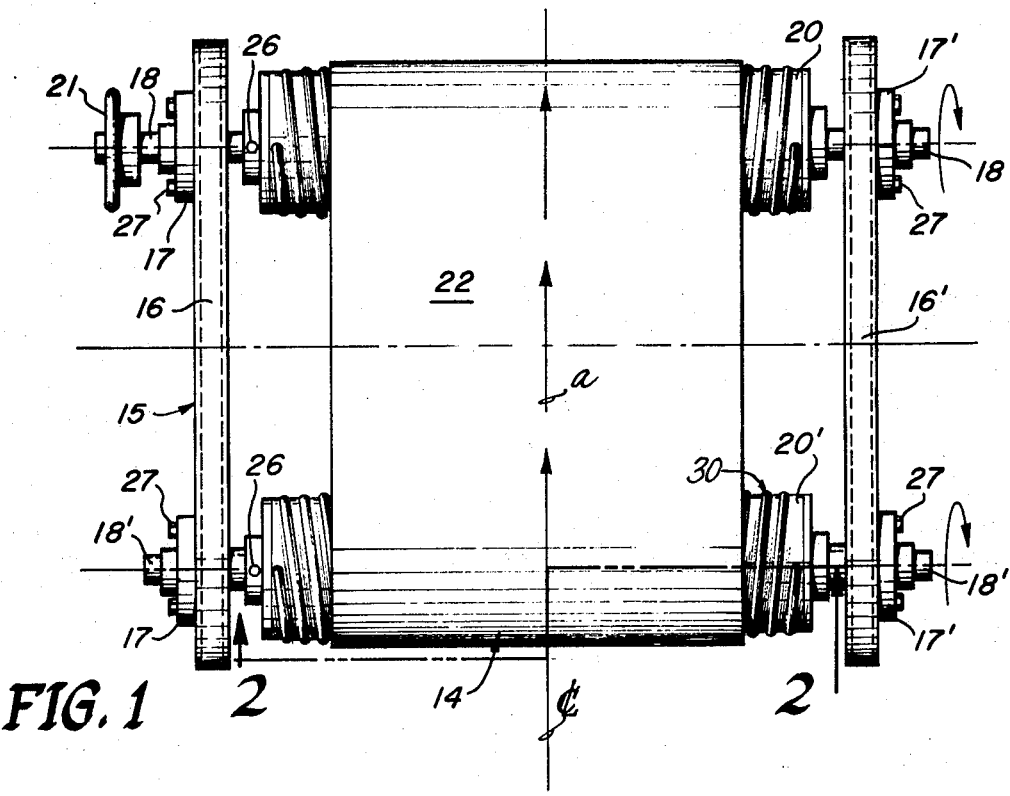
FIG. 1 is a plan view of the short centered, square configurated closed loop belt and roller pulley system embodiment of the present invention.

Referring to FIG. 1, a simple closed loop system of belting 14 is shown to generally include a frame 15 having opposite side walls 16–16' each having bearings 17 and 17', respectively, secured thereto in spaced relation to receive and support a pair of shafts 18–18'. Each shaft has a roller 20–20', respectively, secured thereto for rotation therewith. One shaft 18 (FIG. 1) has a drive sprocket or pulley 21 secured to one extreme end thereof and adapted for drive connection in a conventional manner to a source of motivating power (not shown). The rollers 20–20' have an endless belt 22 trained about them such that as the roller 20 is driven to move the belt 22, the latter tracks over the other roller 20' which turns in unison with such movement.

DETAILED DESCRIPTION

The invention herein is directed to the construction and attributes of the rollers 20–20' and their relation to one another for tracking, centering and aligning belting of various types and kinds, especially of paper, films, woven fibers, and like materials.

Referring to FIGS. 2, 5, 8 and 13, the rollers 20 and 20' are generally similar in that each comprises a tubular or cylindrical body 24 having bushings 25 press fit into each of its ends for mounting of the body 24 on the shaft 18 or 18' as the case may be. The bushings 25 are secured to the respective shafts by a suitable locking pin 26 for rotation therewith in a manner well-known in the art. Each shaft 18–18' has its ends journalled in bearings 17–17' bolted as at 27 to the side walls 16–16' of the frame 15. Either one or both the shaft 18 or 18' may be provided with the drive sprocket or pulley 21. The bolts 27 for bearings 17' for the rollers may be adjusted relative to slots formed in the side walls 16–16' in the initial setting of the bolt and rollers of the closed loop system relative to the belting.

In accordance with the present invention, each roller 20 and 20' is provided with spiralled ribbing 30. In general, the structure and application of the ribbing 30 to either roller is identical and, therefore, like reference numerals are applied to the common structural features of each. In common, the cylindrical body 24 of each roller 20–20' has an annular groove 31 formed at absolute center C midway between its ends. The spiralled ribbing 30 is in the form of wire 32 which may be either of round, rectangular or square configuration in cross section. In the present disclosure, the ribbing 30 is shown to be round steel wire 32 which is applied to the peripheral surface 33 of the cylindrical body 24 of a roller as the latter is turned axially on a lathe and the like. One end of the wire ribbing 32 is first anchored to the surface 33, preferably adjacent one extreme end thereof (see for example the left end of FIG. 2). This anchorage may be accomplished by welding or by inserting the end of the wire 32 into one hole 34 bored radially into the cylinder 24 adjacent a second hole 34' bored likewise to receive and seat a pop rivet 36 in the manner illustrated in FIG. 3 of the drawing. Once one end of the wire ribbing 32 is thus anchored, the wire 32 is wound under tension into uniformly spaced convolutes about the cylindrical body 24 at any pitch required. The pitch required is determined by the texture and characteristics of the belting or material to be tracked.

It should here be noted that the wire ribbing 32 may be applied as a pre-formed helix of spring steel wire stretch fit over the cylindrical body 24. In either event, the ribbing 30 may be a single helix or if desired a double helix in which each end of the roller has two separate wires wound with their convolutes interspersed between each other at uniform spacing.

In FIG. 1, both rollers 20 and 20' are shown to have the ribbing 30 wound identically from each end toward center. The helixes on both sides of center C of each roller commence at identical radial points longitudinally of the roller and terminate at matched terminal ends equally spaced from the centerline C of the roller.

Figure 4:
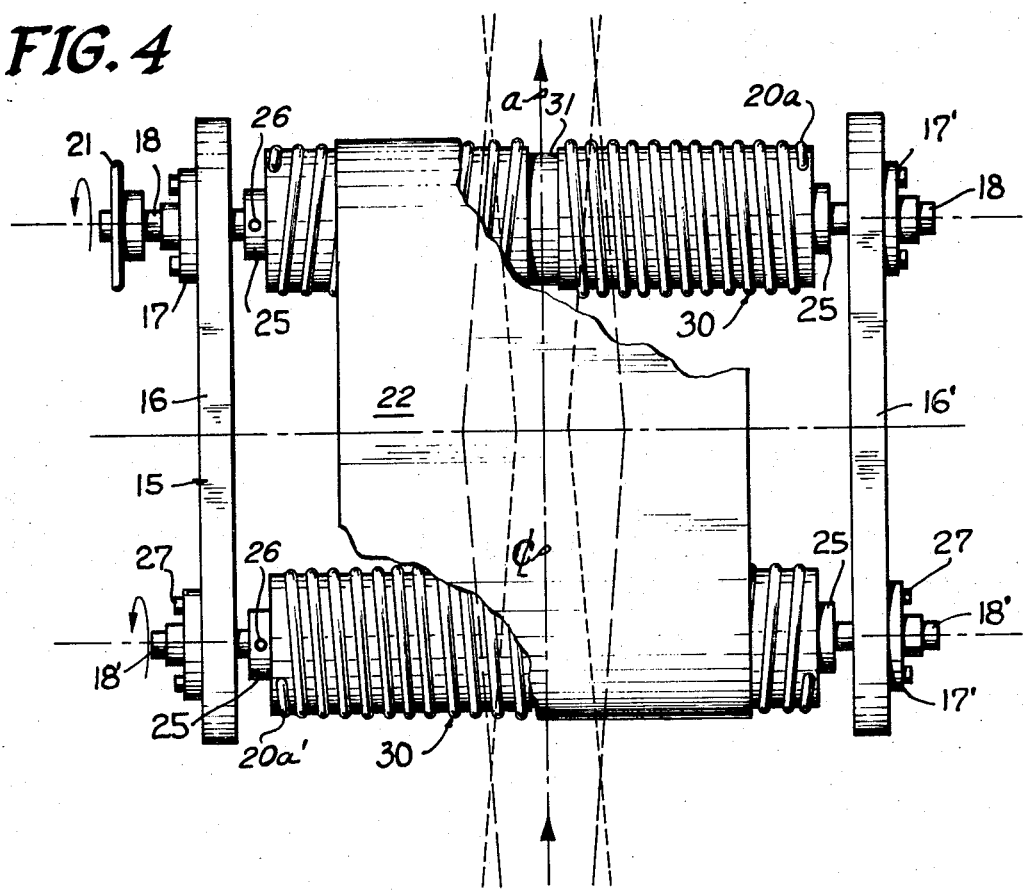
FIG. 4 is a plan view similar to that of FIG. 1 showing reversed spirals on opposite rollers of a set thereof in the closed loop system.
Figure 6:
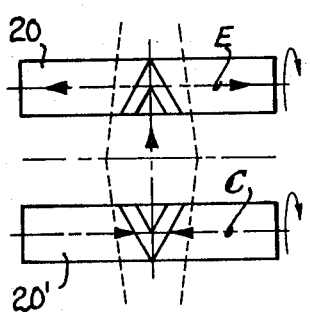
FIG. 6 is a diagrammatical illustration of the rollers only of FIG. 4 showing the directional effect of the pitch of the spirals of the pulling roller upon belting.
Figure 7:
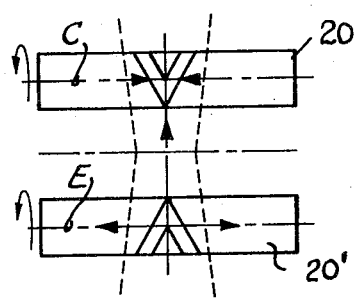
FIG. 7 is a view similar to that of the underside of FIGS. 4 and 6 illustrating the effect when the direction of rotation of the rollers is reversed.

Thus, it will be seen that in the case of FIG. 1, with the belting 22 running in the direction of arrows -a-, both rollers 20 and 20' have their helixes turning screw fashion so as to converge toward center C thereof. The traction of the belt 22 against these inwardly converging convolutes causes the belt to maintain centered relation relative to the rollers. In FIG. 4 it will be noted that the ribbing 30 on each end of the uppermost roller 20a is wound so as to pitch in a direction opposite to the pitch of the ribbing 30 on the ends of the other or lowermost roller 20a' in that view. In FIG. 4, therefore, while the lowermost roller 28a' effects a centering thrust against the belting 22, the reversed pitch on the opposite roller 20a is outwardly tending to thereby exert an outward thrust for expanding the belting both ways outwardly from center. By this arrangement, if the direction of movement of the belt 22 were reversed along with the direction of rotation of the rollers, the result would be the same in that roller 20a would effect a centrally converging centering thrust while the roller 20a' tends to exert an expanding thrust to the belting 22 widthwise. This phenomenon is illustrated diagrammatically in FIGS. 6 and 7 of the drawing.

Figure 2:
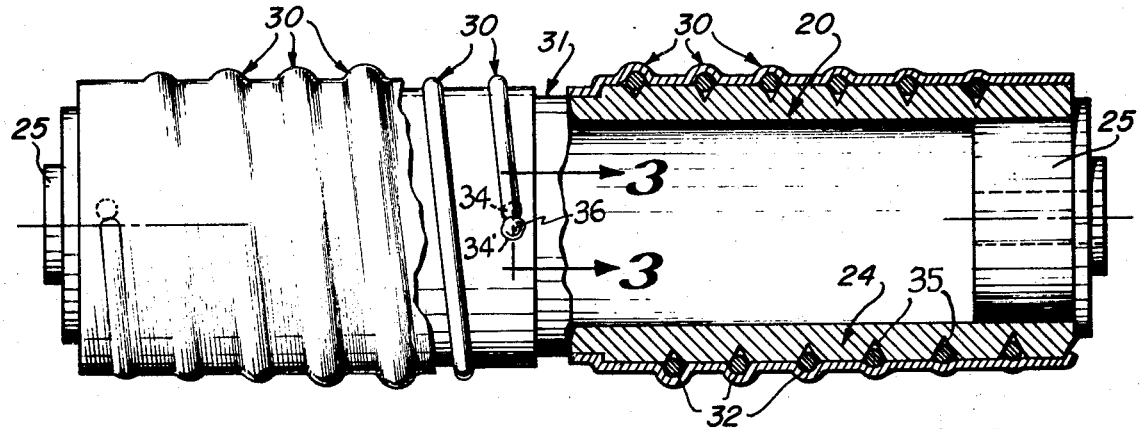
FIG. 2 is an enlarged elevational view of one roller of FIG. 1, partially broken away and part in section for purposes of illustration.
Figure 3:
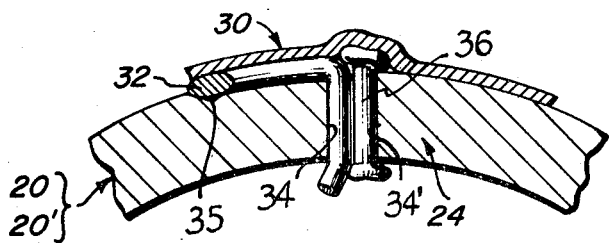
FIG. 3 is a fragmentary section through FIG. 2 taken along line 3—3 thereof.
Figure 5:
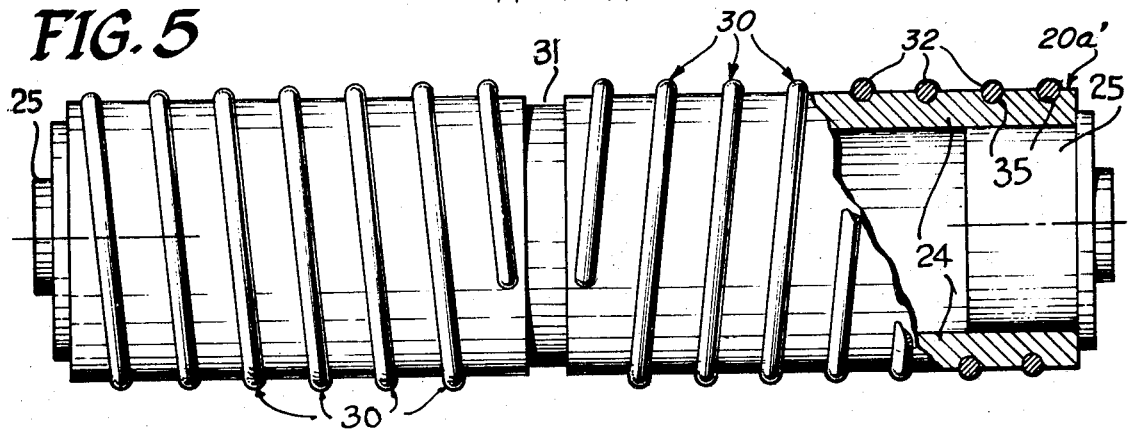
FIG. 5 is an enlarged elevational view of the lowermost one of the rollers in FIG. 4.

Referring again to the structural aspects of either of the rollers 20–20' or 20a–20a', as a feature of the present invention, the ribbing wire 32 is secured in place upon the surface 33 of the roller by seating in a groove 35 formed on the surface 33. The grooves 35 are spirally formed at whatever pitch is required. These grooves 35 may be either V grooves as shown in FIG. 2 or may be round cut as shown in FIG. 5. Once the wire 32 is tightly wound upon the rollers and end anchored thereto, the ribbing 30 becomes as an integral part of the roller. It should here be noted that in lieu of actually winding the wire 32 out the roller, the wire may be pre-coiled spirally to an inside diameter compatible to that of the grooved roller so as to stretch fit relative to the grooved roller.

The present invention also contemplating tapering of the rollers from a larger center diameter toward their ends, it will be appreciated that the tubular member 24 may have its peripheral surface 33 initially tapered, and then grooved as above explained. In accordance with the present invention, initial tapering of the rollers 20–20', 20a–20a' is more simply accomplished on a true cylindrical body 24 by forming the spiral grooves 35 therein at a greater depth adjacent its outer edges and of gradually diminishing depth as the groove 35 approaches center C of the roller (FIGS. 2 and 5). Conversely, it may be said that from their matched anchorages adjacent center, the grooves 35 gradually increase in depth toward their terminal anchorages adjacent the ends of the rollers.

By the foregoing arrangement, the rollers 20–20' and 20a–20a' are tapered in a very simple and effective manner to achieve greater pressure between the central convolutes of the ribbing 30 and the belting 22.

For greater tractional bearing between the belting 14 and the spiral ribbing 30, the latter is provided with waveforms 40. These waveforms consist of undulations formed in the wire element 30 as it is fed onto the cylindrical body 24. The undulating waveforms 40 are bends formed in the wire element 32 inwardly and outwardly radially relative to the cylindrical body 24 as the wire is strung thereon. These waveforms 40 are for the purpose of effecting a greater gripping action relative to certain types of belting as shown in FIG. 8. The undulating waveforms 40 press into the belting to prevent slippage between such belting and thereby assure a timing effect thereto in timed relation with the speed and movement of the driving roller 20 or 20' as the case may be.

As a further feature of the non-slip advantage of the undulating waveforms 40, the spacing of the undulations in relation to the circumference (periphery 33) of the cylindrical body 24 is so calculated that the convolutes of the undulated wire waveforms 40 collectively develop spirally tending waveforms 41 lengthwise the rollers as illustrated along the lines W in FIG. 13. These elongated waveforms 41 thus collectively formed spirally of the several convolutes further tend to cause the belting 22 to either converge toward center or to expand from center outward the rollers as the case may be dependent upon the direction of rotation thereof.

In either form of roller and spiralled ribbing, a suitable coating of non-toxic corrosion resistant material may be applied thereto either by dipping, spraying, painting, or stretch formed material.

Having thus described the structural details of the present invention, the advantages in the function and operation of closed loop systems embodying the same will now be given.

OPERATION

First of all, the simple closed system as shown in FIGS. 1, 4, 6 and 7 are each of the close centered type. However, the self centering feature of the present invention serve to maintain the belting 22 in tracking relation to all of the rollers of any closed loop system 14.

Depending upon the characteristics of the material from which the belting is made, an initial adjustment of the rollers may be required. For example, when a belting material is woven with a right or a left weave, or is laced or bonded into a closed loop at edges out of square, a single sliding bearing adjustment is made at one or the other bearings 17 or 17' relative to the slotted frame 15. This increases or decreases the pulley centers from each other at one or the other side of the belting to compensate for irregularities in belt tension against the rollers.

When the belting material is woven with a right or a left tending weave, a particular pitch in the spiral ribbing is chosen in relation to the speed of travel required and the composition of the belt material. The particular angle chosen is to allow the belting to flex relative to center of the rollers as the belting leaves the rollers to thereby aid in the tracking function and the aligning of the belt relative to center. The number of pitches per inch of belt width may be greater or lesser according to the belt engaging surface area required for pulling power, especially in case of the drive pulley.

When in a closed loop system the belt engaging surfaces i.e., length of the rollers, dimensionally exceed the distance between rollers, the rollers constructed in accordance with the present invention will maintain the belt in tracking relation as well as adjusted centering alignment with these rollers.

Theoretically, with an approximate minimum 180° contact between the peripheries of each of two or more rollers having the converging and/or converging and expanding features of the present invention, it is possible to move the belting to any position needed on the peripheral surface 33 of the rollers. It could be either to the extreme right or the extreme left of center but in all cases, an established alignment free of weaving.

The function is to throw the belt into a new lead angle as it approaches the rollers by pulley shaft adjustment at one of the bearings 27 along one or the other side wall 16 or 16' of the frame 15. Once this is achieved, the belt will not wander from its new, i.e., adjusted position relative to rollers constructed with the present invention. Accordingly, a closed loop system embodying the rollers of the present invention will maintain the belting in tracking engagement as well as centered relation to the rollers regardless of the latter being rotated about a vertical axis as well as a horizontal axis or any tilted form of frame between vertical and horizontal disposition.

Figure 9:
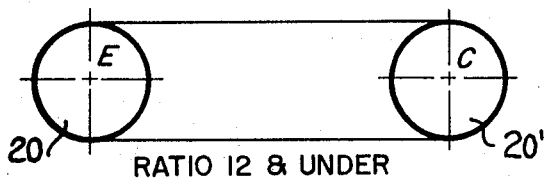
FIG. 9 is a diagram of a pair of rollers of equal diameter confined within a closed loop system and the ratio ideal of roller diameter to distance between rollers suited for the belt centering and aligning tracking rollers of the present invention.

Referring to FIGS. 9 through 12, various closed loop systems of belting are shown with notations as to the ideal ratio of belt width to pulley centers in accordance with the present invention. In a system as illustrated in FIG. 9 the distance between pulley centers may be 12 times the width of the belting. It should here be noted that the two pulleys are designated E for expanding spiralled ribbing and C for converging spiralled ribbing. Moreover, each pulley E and C has a full 180° grip or contact with the spiralled ribbing of the rollers.

Figure 10:
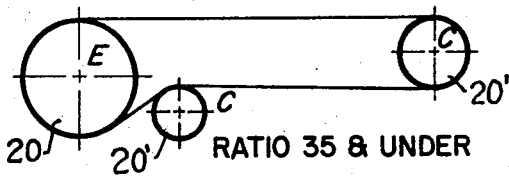
FIG. 10 is a diagram of another closed loop system of overall greater ratio but closer relation of the belt aligning roller embodiment of the present invention.

In FIG. 10 in which the ratio of belt width to pulley centers may be 35 and under, it will be noted that the larger diametered roller which is of the belt expanding type is close centered to a smaller idler roller of the belt converging type to compensate for the distance to the opposite and remotely centered roller of the conveyor which is also of the belt converging type.

Figure 11:
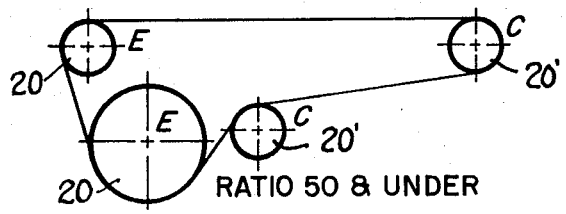
FIG. 11 is a diagram of yet another closed loop system of still greater overall ratio but illustrating the increased belt aligning feature of the closer related belt aligning rollers in accordance with the present invention.

In the closed system of FIG. 11 expressing the ratio of centers between the straight reach of the belting as that of 50 widths of the belting or under, the tracking, aligning and centering function is provided by the enlarged roller E in proximity to the lesser diametered roller E as well as an idler roller C which adds to and compensates for the smaller converging roller C at the far end of the straight reach of the belting as in the case of FIG. 10.

By combining a pair of larger diametered rollers C and E in close proximity and a better than 180° wrap of belting about each of them as shown in FIG. 12, any ratio of pulley centers to belt width may be attained.

With more durable and sturdy belting material, the waveform type of ribbing as illustrated in FIGS. 8 and 13 would be applied. This waveform type ribbing affords the impression of a tooth-like pattern into the roller contacting surface of such belting to thus increase the load bearing capacity as well as assuring a non-slip contact suitable for timing of the belting speed in accordance with the speed of the powered roller of the system. Accordingly the ideal ratios of belt width to pulley centers as disclosed in FIGS. 9 through 12 does not apply to rollers having the waveform type of ribbing.

Having thus specifically described the belt aligning and centering features for tracking rollers in a closed loop system, it will be appreciated by those skilled in the art that the same may be susceptible to variations, alterations and or modifications without departing from the spirit or scope of our invention therein as expressed in the appended claims in which

We claim:

1. In a closed loop system of belt and pulleys a pair of belt centering and aligning tracking rollers each comprising:
    a. a cylindrical body of a length slightly greater than the width of the belt trained thereabout;
    b. separate coils of wire having oppositely pitched convolutes mounted on opposite ends of the periphery of said cylindrical body and having matched inner ends spaced from and in proximity to each other substantially midway the ends of said cylindrical body; and
    c. means for anchoring the respective ends of said separate coils of wire to the periphery of said cylindrical body.

2. Tracking rollers in accordance with those of claim 1, each including an annular depression in the periphery of said cylindrical body between the matched inner ends of the separate coils of wire thereon.

3. Tracking rollers in accordance with those of claim 2, in which said means for anchoring the ends of said coils of wire to the periphery of said cylindrical body includes:
    a. means for securing the matched inner ends of said coils of wire radially of and parallel to the axis of said cylindrical body; and
    b. means for securing the opposite outer ends of said coils of wire to said cylindrical body in longitudinal alignment with said matched inner ends of said coils parallel to the axis of said cylindrical body.

4. The tracking rollers in accordance with those of claim 3, in which said separate coils of wire have their oppositely pitched convolutes pitched in a direction tending to wind toward center relative to the direction of rotation of said rollers for urging the belting engaged thereby toward said annular depression between the matched inner ends of said coils of wire.

5. The tracking rollers in accordance with those of claim 4, in which said oppositely pitched coils of wire on said cylindrical body have minimal surface contact with the belting engaged thereby while urging the outer halves of the belting width toward said annular depression between the matched inner ends of said coils of wire.

6. The tracking rollers in accordance with those of claim 5, in which the lands between the oppositely pitched convolutes of said coils of wire have minimal surface contact between the peripheral surface of said cylindrical body and said belting affording a cooling effect to the latter.

7. The tracking rollers in accordance with those of claim 6, in which said separate coils of wire include waveforms undulating inwardly and outwardly radially relative to said cylindrical body.

8. The tracking rollers in accordance with those of claim 7, in which the waveforms on adjacent convolutes of said coils of wire collectively present spirally tending waveforms over the length of each end of said cylindrical body further tending to urge said belting toward the annular depression between matched inner ends of said coils of wire.

9. The tracking rollers in accordance with those of claim 8, including a non-corrosive-non-toxic coating covering the periphery of coils of wire on said cylindrical bodies.

10. The tracking rollers in accordance with those of claim 4, in which said rollers have their oppositely pitched separate coils of wire inversely related relative to the direction of movement of the belt such that:
   a. the separate coils of wire on one of said rollers have their oppositely pitched convolutes pitched in a direction tending to wind inwardly toward said center annular depression relative to the direction of rotation of said one of said rollers; and
   b. the separate coils of wire on the other one of said rollers have their oppositely pitched convolutes pitched in a direction tending to wind outwardly from said center annular depression toward the ends of such rollers relative to the direction of rotation of the latter to thereby afford centering action by such other one of said rollers in the event of reversal of direction of movement of the belt trained about said pair of rollers.

11. The tracking rollers in accordance with those of claim 10, in which the peripheral surface of each of the said cylindrical bodies of said rollers is of greatest diameter adjacent the annular depression therein and of gradually diminishing diameter tapering toward the opposite ends of each of said cylindrical bodies.

12. In a closed loop system of belt and pulleys having end rollers distanced at any ratio of belt width to end roller centers, the combination therewith of a pair of belt centering and aligning tracking rollers and in which each of the rollers in said system comprises:
   a. a cylindrical body of a length slightly greater then the width of the belt trained thereabout;
   b. a pair of oppositely pitched equally spaced spirally tending grooves formed in the peripheral surface of said cylindrical body from matched points in proximity to each other centered substantially midway the ends of said cylindrical body;
   c. each of said spirally tending grooves having gradually diminishing depth from said centered matched points toward the ends of said cylindrical body; and
   d. a wire element spirally seated in each of said spirally tending grooves for presenting a tapering belt contacting and centering ribbing to said belting from center of said cylindrical body toward its outer edges.

13. The tracking rollers in accordance with those of claim 12, including means for securing the respective ends of said wire elements to the peripheral surface of the respective cylindrical body in alignment with each other longitudinally of said cylindrical body.

14. The tracking rollers in accordance with those of claim 13, including an annular depression formed in the peripheral surface of their respective cylindrical bodies between the innermost matched points of said grooves therein and midway the ends of said cylindrical bodies.

15. The tracking rollers in accordance with those of claim 14, in which said wire elements seated in the oppositely pitched spiral grooves on said cylindrical body have minimal surface contact with the belting engaged thereby for urging the outer halves of the belting width toward said annular depression between the matched inner ends of said coils of wire.

16. The tracking rollers in accordance with those of claim 15, in which the lands on the peripheral surface of said cylindrical body between the oppositely pitched convolutes of said wire element have minimal surface contact the belting trained thereabout affording a cooling effect to the belting.

17. The tracking rollers in accordance with those of claim 16, in which said wire elements seated in the oppositely pitched spiral grooves have waveforms undulating inwardly and outwardly radially relative to said cylindrical body.

18. The tracking rollers in accordance with those of claim 17, in which the waveforms on adjacent convolutes of said oppositely pitched wire elements collectively present spirally tending waveforms over the length of each end of said cylindrical body further tending to urge said belting toward the annular depression between matched inner ends of said coils of wire.

19. The tracking rollers in accordance with those of claim 18, including a non-corrosive-non-toxic coating covering the periphery of coils of wire on said cylindrical bodies.

20. The tracking rollers in accordance with those of claim 14, in which the spirally tending grooves formed on said rollers are inversely related relative to the direction of movement of the belt such that:
   a. the wire elements sealed in the oppositely tending grooves on one of said rollers have their oppositely pitched convolutes pitched in a direction tending to wind inwardly toward said center annular depression relative to the direction of rotation of said one of said rollers; and
   b. the wire elements sealed in the oppositely tending grooves on the other one of said rollers have their oppositely pitched convolutes pitched in a direction tending to wind outwardly from said center annular depression toward the ends of such rollers relative to the direction of rotation of the latter to thereby afford centering action by such other one of said rollers in the event of reversal of direction of movement of the belt trained about said pair of rollers.

* * * * *